United States Patent [19]

Hyvärinen

[11] Patent Number: 5,945,839
[45] Date of Patent: Aug. 31, 1999

[54] METHOD AND APPARATUS FOR MEASUREMENT OF CURRENT-VOLTAGE CHARACTERISTIC CURVES OF SOLAR PANELS

[75] Inventor: Jaakko Hyvärinen, Espoo, Finland

[73] Assignee: Microchemistry Ltd., Espoo, Finland

[21] Appl. No.: 08/821,675

[22] Filed: Mar. 20, 1997

[30] Foreign Application Priority Data

Mar. 20, 1996 [FI] Finland .................................. 961292

[51] Int. Cl.$^6$ .................................................. G01R 31/26
[52] U.S. Cl. ......................... 324/765; 324/501; 136/290
[58] Field of Search .................... 324/765, 501; 136/290

[56] References Cited

U.S. PATENT DOCUMENTS

| | | | |
|---|---|---|---|
| H111 | 8/1986 | Flesner | 324/765 |
| 4,122,383 | 10/1978 | Von Roos | 136/290 |
| 4,129,823 | 12/1978 | van der Pool et al. | 324/20 R |
| 4,301,409 | 11/1981 | Miller et al. | 136/290 |

Primary Examiner—Mark Chapman

[57] ABSTRACT

The method and apparatus for measuring the current-voltage characteristic curve of a solar panel uses cost-effective equipment and a minimized need of optical output power. A light pulse is applied to the solar panel and the response of the solar panel to the light pulse is measured by varying the electrical load connected to the output of the solar panel. The measurement is carried out with the help of a short-duration decaying light pulse such that the falling tail of the pulse is used for such a short period that the intensity of the pulse does not have time to change essentially during the measurement.

20 Claims, 5 Drawing Sheets

METHOD AND APPARATUS FOR MEASUREMENT OF CURRENT-VOLTAGE CHARACTERISTIC CURVES OF SOLAR PANELS

BACKGROUND OF THE INVENTION

1. Field of the Invention

The present invention relates to a method for the measurement of current-voltage characteristic curves of solar panels.

The invention also concerns an apparatus for the measurement of current-voltage characteristic curves of solar panels.

2. Description of Related Art

In the quality control and product development of solar panels, it is mandatory to test the panels using standardized test methods. Herein, simulation test methods are the only feasible choice, because natural sunlight does not produce reproducible test conditions. Typically, the tests are carried out to study the current output capability of a solar panel at varying loads under constant illumination conditions.

One commonly used method of testing solar panels is to subject them to a continuous flux of artificial light corresponding to the intensity of natural sunlight. This method subjects the panels to substantial heating and, moreover, consumes a lot of energy from the light sources. Heating the panels causes problems in the standardized measurement procedure, because according to standards, the measurement should be carried out at 25° C. Besides, it is difficult to provide a light source capable of producing illumination with an even intensity distribution.

The next step in evolving standards is represented by the pulsed-light test method in which the solar panels are subjected to a short-duration pulse of artificial sunlight illumination delivering an intensity pulse with a rectangular pulse waveform. Typically, the energy of such a light pulse is about 10 kJ. The duration of the light pulse is generally in the order of a few milliseconds. To produce such a large amount of light energy as a rectangular pulse requires high-output equipment, which becomes very expensive. Generation of a long-duration light pulse from a discharge lamp requires complicated power electronics because the level of illumination should be controllable. Further, the light source control must be designed for high-current switching with a low error margin, these requirements inevitably resulting in expensive apparatuses.

SUMMARY OF THE INVENTION

It is an object of the present invention to overcome the drawbacks of the above-described technique and to provide an entirely novel type of method and apparatus for the measurement of current-voltage characteristic curves of solar panels.

The goal of the invention is achieved by subjecting the solar panel to the light pulse of a conventional flash apparatus, whereby only a short portion of the exponentially falling tail following the main flash pulse is utilized for the measurement.

The invention offers significant benefits.

The approach according to the invention offers testing of solar panels with the help of extremely cost-effective equipment. The minimized need of optical output power also reduces the warming-up of the panel from prior-art levels. If the test pulse intensity is desired to be altered, it can be accomplished simply by altering the measurement trigger level.

BRIEF DESCRIPTION OF THE DRAWINGS

In the following, the invention will be examined in greater detail with the help of exemplifying embodiments illustrated in the appended drawings in which.

DETAILED DESCRIPTION

Figure 1:
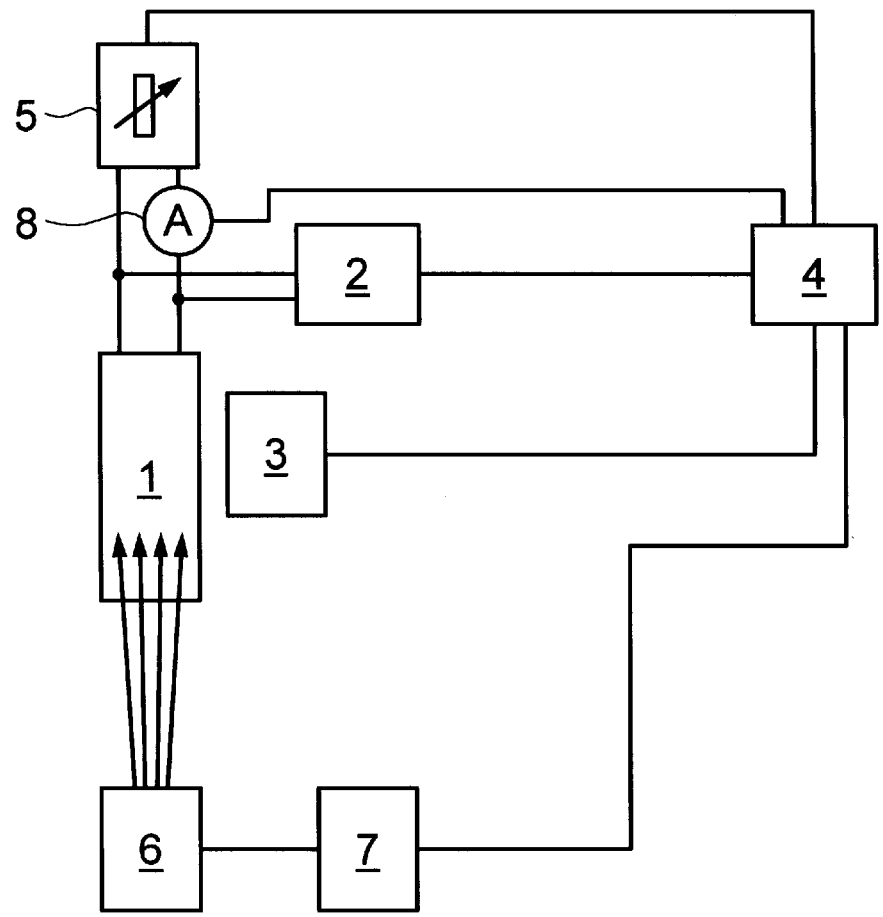
FIG. 1 shows the block diagram of an apparatus according to the invention.

With reference to FIG. 1, an adjustable load 5 such as a voltage-controlled FET (Field-Effect Transistor) is connected over the output terminals of a solar panel 1. The load resistance is controlled by a control circuit 4. By use of a feedback loop, the load is controlled such that the output voltage of the solar panel 1 changes substantially linearly during the measurement, such, however, that the voltage rate-of-change is retarded at the very beginning of the measurement cycle. During the measurement, the output current is measured by a current meter 8 and the output voltage by a voltage meter 2. The current measurement can be implemented with the help of a shunt resistor or a current transformer. The lamp 6 of the flash apparatus is triggered independently, and the measurement triggering is set to occur when the signal of a light detector 3 reaches a preset trigger level, e.g., the 1000 W/m$^2$ intensity level of a standard sun. The lamp 6 can be a xenon discharge lamp, for instance.

Figure 2:
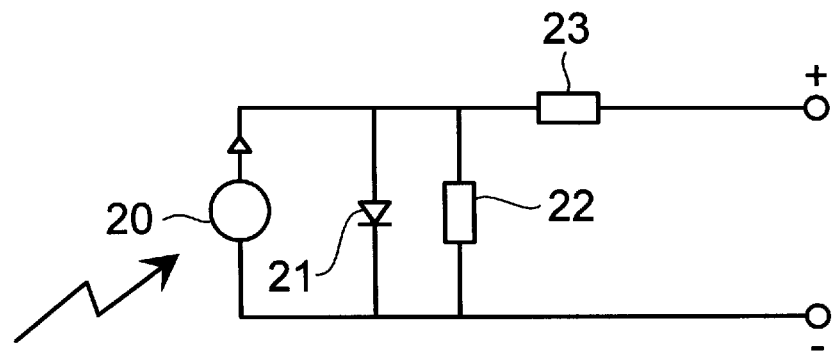
FIG. 2 shows the equivalent circuit of a solar panel.

With reference to FIG. 2, the equivalent circuit of a single solar cell element in the solar panel 1 of FIG. 1 is comprised of an ideal current source 20, a diode 21 connected in parallel with the source, and a parallel resistance 22 and a series resistance 23. In practice, the parallel resistance 22 is very large and the series resistance 23 very small, respectively. In an assembled solar panel, a required number of the solar cell elements of FIG. 2 are connected in series, whereby a typical number of the cells is, for instance, 36.

Figure 3:
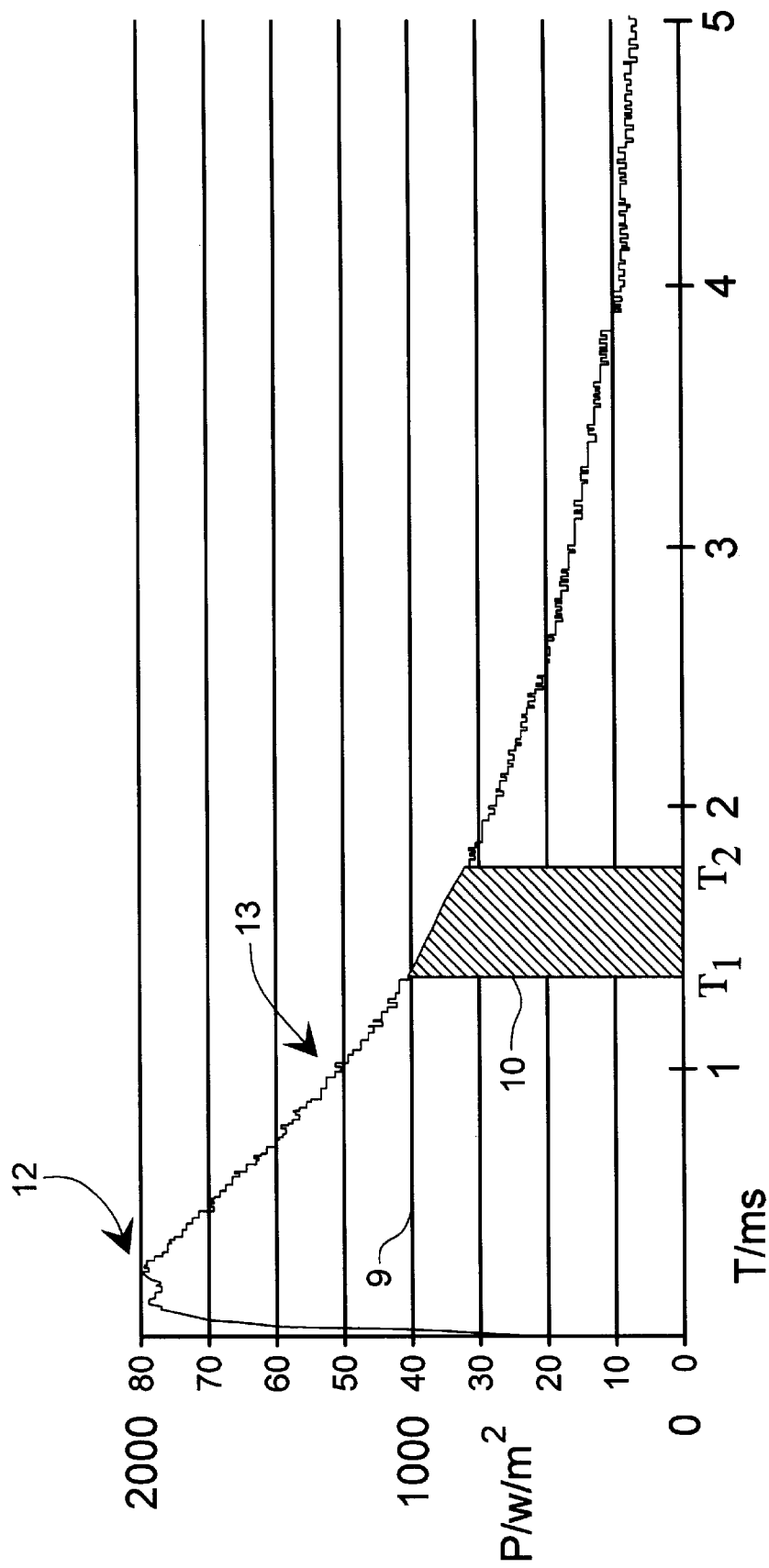
FIG. 3 is a graph illustrating the method according to the invention and also the shape of the light pulse generated by conventional techniques.

With reference to FIG. 3, the shape of the light pulse according to the invention is formed by a fast-rising, short-duration peak 12 followed by a substantially exponentially decaying tail 13. The sampling rate of the curve shown in the graph of FIG. 3 is 1000/5 ms, that is 200 khz. In the exemplifying case, the pulse peak 12 corresponds to double the intensity of a standard sun. The level of single standard sun intensity is denoted by a horizontal line 9. The light pulse is generated by a conventional flash apparatus intended for photographic studio use in which electric energy charged in a capacitor is applied to a gas-discharge lamp. Each different flash lamp type has a typical time constant which characterizes the decay of the light pulse subsequent to the peak 12. In the illustrated case, the decay time constant is 3.5 ms. According to the invention, the tail 13 of the light pulse is used in the measurement for the area 10 remaining between the triggering instants $T_1$ and $T_2$. According to a preferred method, the measurement is preferably started exactly when the light pulse intensity is equal to the single standard sun intensity 9. The total energy of the pulse of FIG. 3 from 0 to 5 ms is typically 3200 J. The measurement time between $T_2$ and $T_1$ is typically 400 μs. This arrangement makes it possible to keep the light pulse intensity within ±5% of the target value of single standard sun intensity, and when the time dependence of the light pulse intensity is known, the effect of intensity variations can be compensated for by computational adjustments during the processing of the measurement results on a computer. The start instant $T_1$ of the measurement is determined by the output signal of element 3 of FIG. 1 that triggers the desired start intensity level. In a practical circuitry, this can be implemented, e.g., by use of a comparator and an adjustable reference voltage.

When generated by conventional techniques, the duration of an essentially constant-intensity rectangular light pulse will typically be several milliseconds with a total energy of about 10,000 J. As noted above, such a light pulse is awkward to generate, and moreover, the high radiant energy tends to heat the solar panel.

Figure 4:
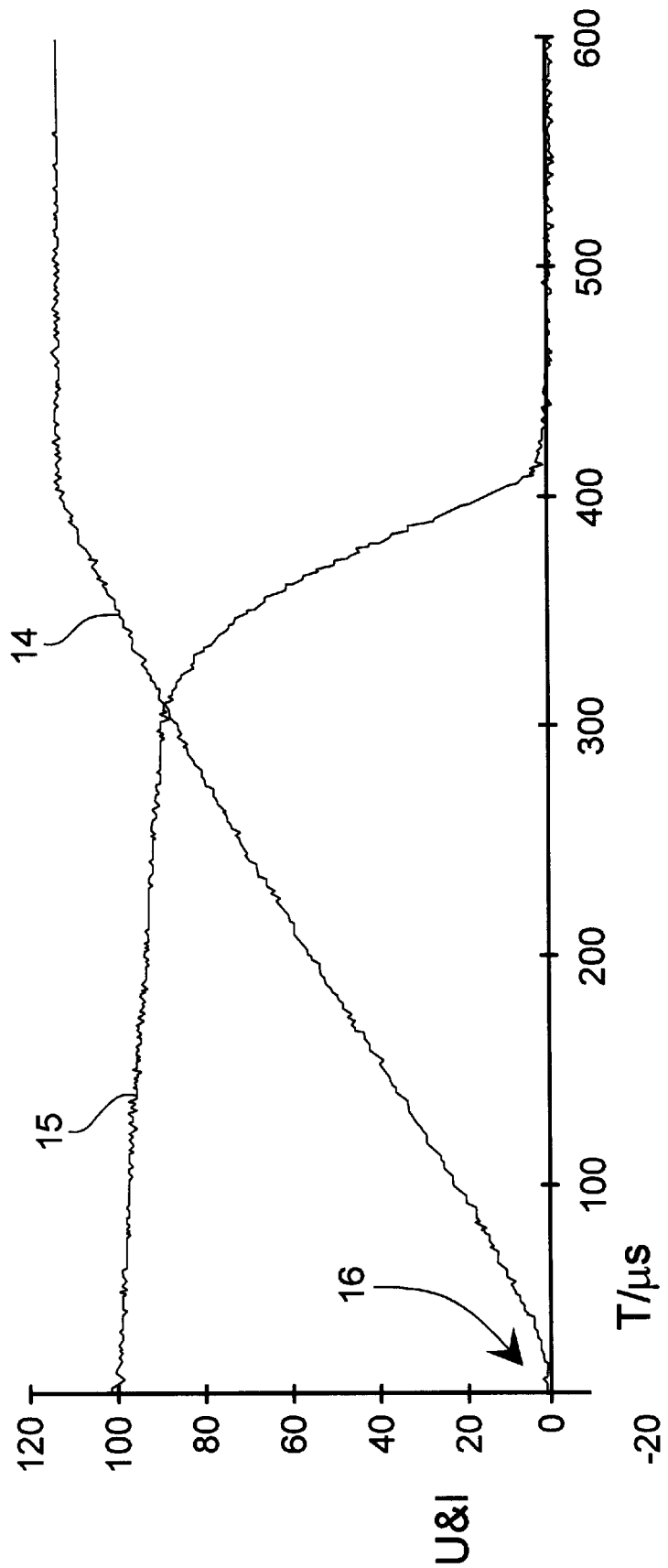
FIG. 4 is a graph illustrating the current-voltage relationship of a solar panel as measured by the method according to the invention.

The current graph 15 and voltage graph 14 recorded by, for example the measurement equipment of FIG. 1 are plotted in FIG. 4. The graphs are recorded with the help of measurement equipment 2 and 8 controlled by the control circuit 4, and by output of the adjustable load 5. In the exemplifying test, the maximum current is about 3 A and the maximum voltage about 22 V. The measurement values are obtained from a panel having 36 cells in series. The duration of a full measurement cycle is typically 400 μs, and the load is adjusted such that the rate-of-change of the voltage 14 is essentially linear. Due to technical constraints posed by the short interval to be measured, the voltage measurement is carried out such that at the start 16 of the measurement, the load 5 is reduced (for example by increasing its resistance) in a manner that causes the voltage 14 to rise slightly more slowly than in the case of a linear change. In a practical circuitry, this can be accomplished, e.g., under program control, whereby a feedback loop is established between the load control and the voltage measurement.

Figure 5:
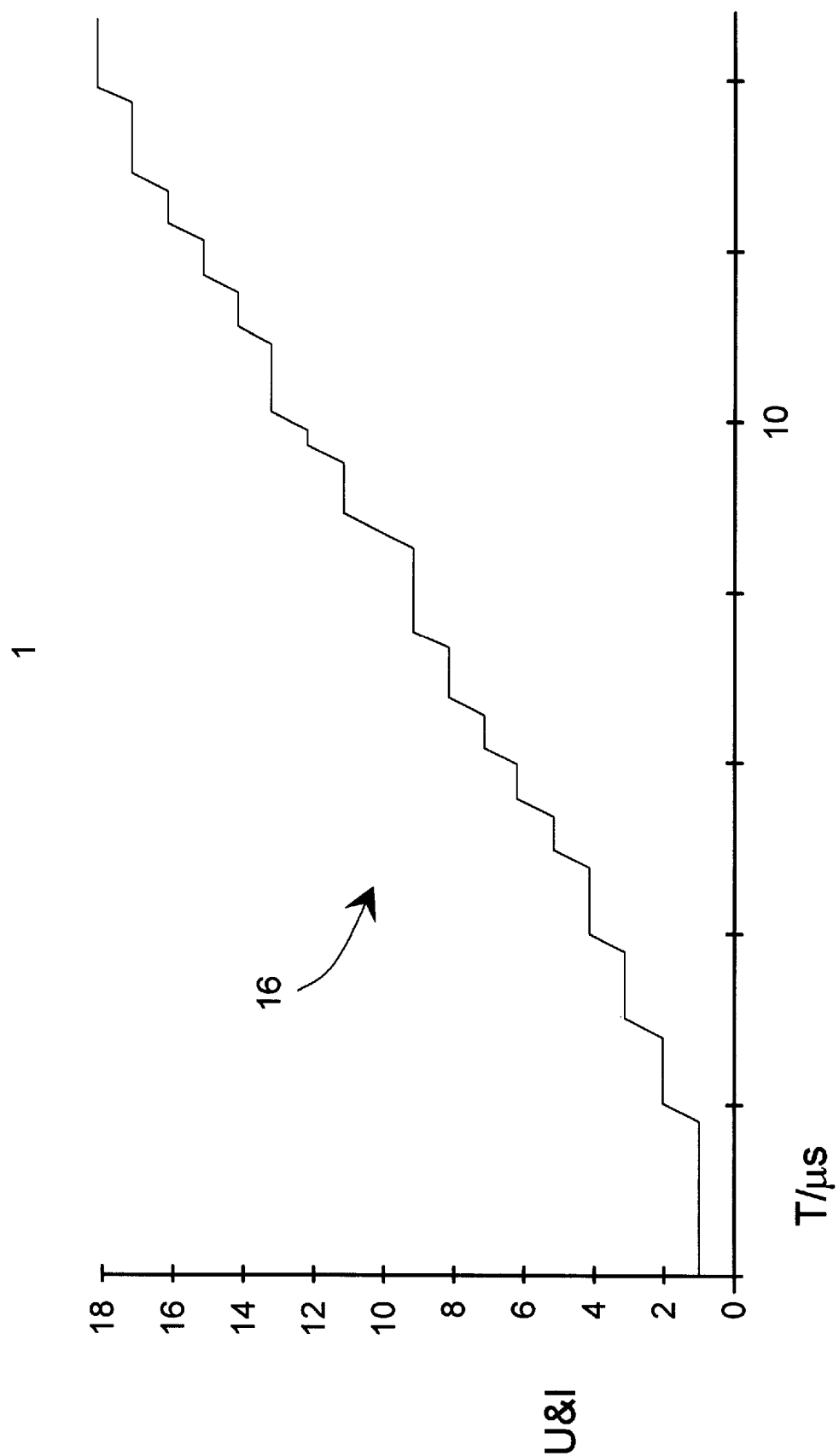
FIG. 5 shows a detail of the current-voltage graph of FIG. 4.

FIG. 5 illustrates in detail such a delayed reduction of the load.

Figure 6:
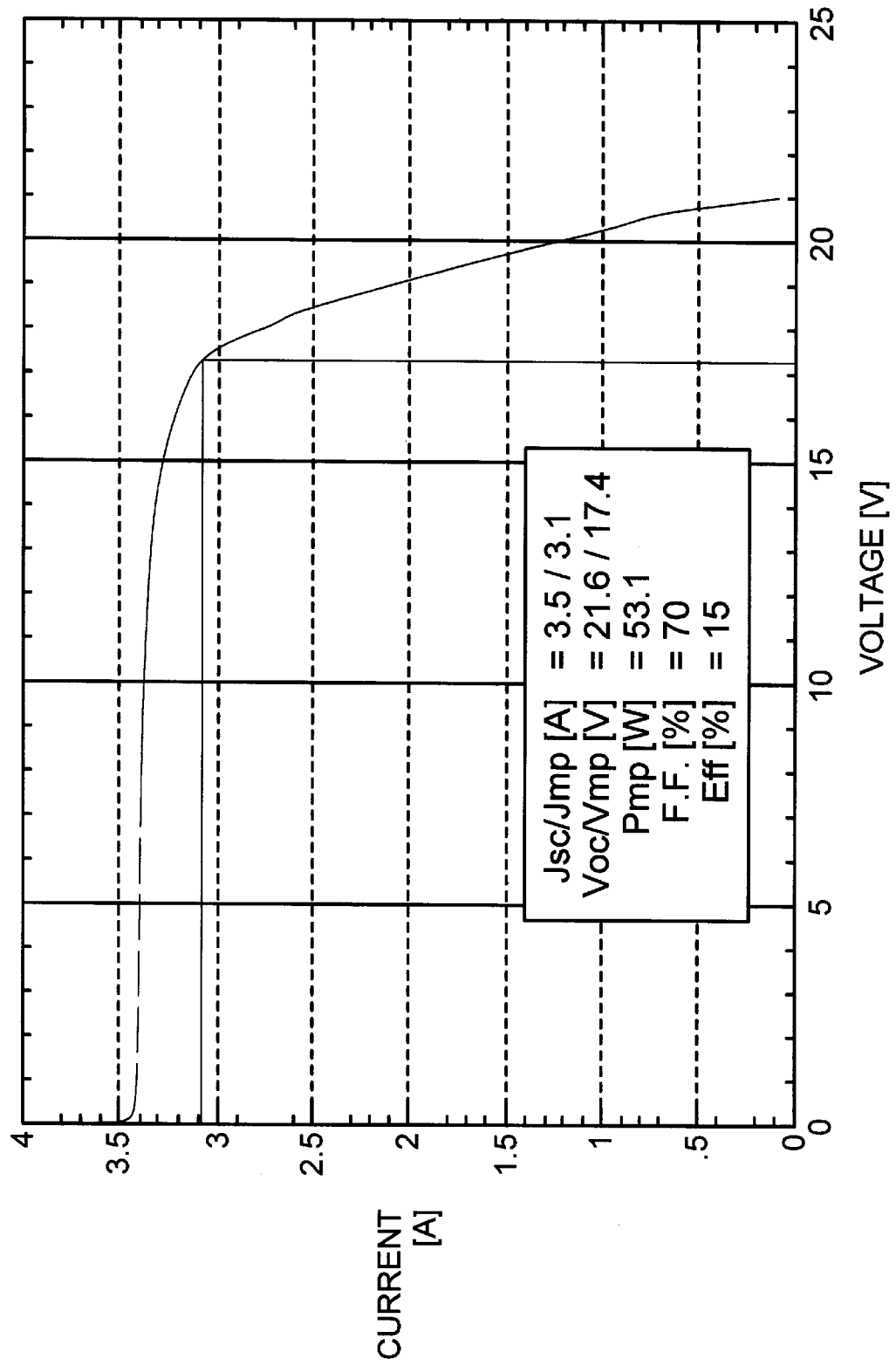
FIG. 6 shows the current-voltage characteristic curve of a solar panel.

FIG. 6 in turn illustrates an exemplifying sample of a current-voltage characteristic curve of a solar panel measured according to the invention.

I claim:

1. A method for measuring a current-voltage characteristic curve of a solar panel, comprising the steps of:
    a) applying an input light pulse to the solar panel, the input light pulse having a falling tail; and
    b) measuring a response of the solar panel to the falling tail of the input light pulse.

2. The method as defined in claim 1, wherein a rate-of-rise of an electric load at the start of the measurement is slower than at the end of the measurement.

3. The method as defined in claim 1, before the step a), further comprising generating the input light pulse with a xenon gas-discharge lamp.

4. The method as defined in claim 1, further comprising:
    c) monitoring an intensity level of the falling tail of the light pulse; and
    d) starting the step b) when the intensity level reaches a predetermined level.

5. The method as defined in claim 1, wherein the step b) measures the response for an interval such that the intensity of the falling tail of the input light pulse does not change essentially during the measurement.

6. An apparatus for the measurement of a current-voltage characteristic curve of a solar panel, comprising:

a light source generating an input light pulse having a falling tail and applying the light pulse on the solar panel;

current measurement means for measuring an output current of the solar panel generated by the falling tail of the applied input light pulse;

voltage measurement means for measuring an output voltage of the solar panel generated by the falling tail of the applied input light pulse;

an adjustable load applying different load resistances for the output current and voltage measurements of the solar panel;

a control unit connected to said current measurement means voltage measurement means, and said load for the control of a measurement sequence; and a light detector triggering the measurement during the falling tail of the light pulse.

7. The apparatus as defined in claim 6, further comprising means for controlling said adjustable load such that the rate-of-rise of said adjustable load is smaller at a start of a measurement cycle than at an end of the measurement cycle.

8. The apparatus as defined in claim 6, wherein said light source is a xenon gas-discharge lamp.

9. The apparatus as defined in claim 6, wherein the falling tail of said light pulse is essentially exponentially decaying.

10. The apparatus as defined in claim 6, wherein the light detector triggers the measurement when an intensity of the falling tail of the light pulse reaches a predetermined level.

11. An apparatus for the measurement of output capability of a solar panel, comprising:

a light source that applies a light pulse on the solar panel, the fight pulse having a falling tail; and a measuring unit that measures a response of the solar panel to the falling tail.

12. The apparatus as defined in claim 11, wherein the falling tail is measured for an interval such that the intensity of the pulse does not change essentially during the measurement.

13. The apparatus as defined in claim 11, wherein the measuring unit includes at least one of a current measuring element and a voltage measuring element.

14. The apparatus as defined in claim 11, further comprising a light detector that monitors an intensity level of the falling tail and triggers the measurement when the intensity level reaches a predetermined level.

15. The apparatus as defined in claim 11, wherein the light pulse has a pulse peak greater than an intensity of the sun.

16. The apparatus as defined in claim 11, wherein the light source is a flash apparatus in which electric energy charged in a capacitor is applied to a gas-discharge lamp.

17. The apparatus as defined in claim 11, wherein the measurement is started during the falling tail when an intensity of the light pulse is equal to a intensity of the sun.

18. The apparatus as defined in claim 11, further comprising an adjustable load connected to the solar panel that applies a load resistance for the measurements of the measuring unit.

19. the apparatus as defined in claim 18, further comprising a control unit connected to the measuring unit and the adjustable load to control the load resistance.

20. The apparatus of claim 19, wherein the control unit includes a feedback loop that controls the adjustable load such that an output power of the solar panel changes substantially linearly during the measurement.

* * * * *